L. O. & A. R. LARSON & S. JOHNSON.
TRACTION WHEEL.
APPLICATION FILED FEB. 2, 1910.

964,279.

Patented July 12, 1910.

Witnesses
Frank B. Hoffman
John A. Dougay

Inventors
Louis O. Larson,
Arvid R. Larson,
Sigfred Johnson,
By Victor J. Evans
Attorney

UNITED STATES PATENT OFFICE.

LOUIS O. LARSON, ARVID R. LARSON, AND SIGFRED JOHNSON, OF EL CAMPO, TEXAS.

TRACTION-WHEEL.

964,279.  Specification of Letters Patent.  Patented July 12, 1910.

Application filed February 2, 1910. Serial No. 541,574.

*To all whom it may concern:*

Be it known that we, LOUIS O. LARSON, ARVID R. LARSON, and SIGFRED JOHNSON, citizens of the United States, residing at El Campo, in the county of Wharton and State of Texas, have invented new and useful Improvements in Traction-Wheels, of which the following is a specification.

This invention relates to improvements in wheels and has particular reference to improving wheels such as are employed on traction engines.

It is well-known that the driving wheels of a traction engine are provided on the outer faces of their rims with transversely disposed lugs designed to embed themselves in the ground during the movement of the wheels and slipping and skidding to a certain extent prevented. It has been found in practice however, that this method of providing traction wheels with transversely disposed lugs does not always prevent skidding and slipping, and especially when the engine is passing over muddy and sandy ground; this is due to the fact that the mud and sand soon fills the spaces between the lugs with the result that the outer surface of the wheel is rendered practically smooth.

The present invention therefore aims to remedy this defect in the construction of traction wheels by providing a wheel including a pair of spaced rims, connected by a plurality of cross bars having sockets and lugs secured in the sockets corresponding to the transversely arranged lugs on the ordinary traction wheel.

With these and other objects in view, which will more fully hereinafter appear, the present invention consists in certain novel details of construction and arrangement of parts, hereinafter fully described, illustrated in the accompanying drawings and more particularly pointed out in the appended claims; it being understood that various changes in the form, proportion, size, and minor details of the device may be made, within the scope of the appended claims, without departing from the spirit or sacrificing any of the advantages of the invention.

Figure 1:
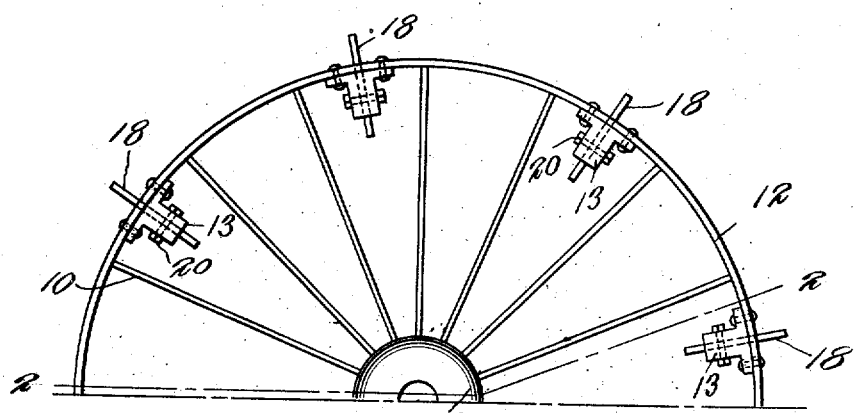
Figure 2:
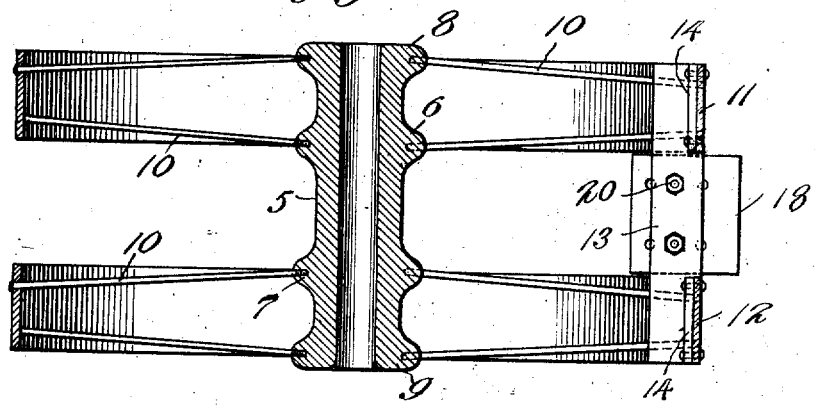
Figure 3:
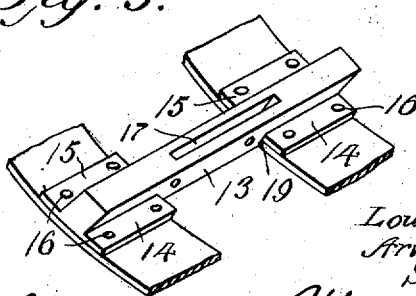

In the accompanying drawings forming a part of the specification; Figure 1 is a side elevation of one half of a traction wheel constructed in accordance with our invention. Fig. 2 is a sectional plan view of the same approximately on the line 2—2 of Fig. 1. Fig. 3 is a fragmentary perspective of the rims and also showing a cross bar in position and connecting said rims.

Similar numerals of reference are employed to designate corresponding parts throughout.

The hub of the wheel is designated by the numeral 5 and corresponds to the construction of the ordinary traction wheel hub with the exception that it is approximately twice the length of the latter. Formed on either side of the middle of the hub are annular shoulders 6 and 7 and similarly formed shoulders 8 and 9 are located at the opposite ends of the hub. These shoulders are provided with a plurality of spaced interiorly threaded openings which receive the lower ends of the spokes 10. As usual the spokes 10 are of metal and extending oblique to the longitudinal axis of the hub.

The rims are designated by the numerals 11 and 12 and have openings for the reception of the spokes 10. By reference now to Figs. 2 and 3 it will be seen that each rim corresponds in width approximately to one-third the length of the hub, so that when the rims are connected with the hub by means of the spokes 10, a space equal to the width of one rim will exist between the rims.

The rims are connected by means of a plurality of cross bars designated in general by the numerals 13. These members are spaced at equal intervals on the inner surfaces of the rims, the space between two adjacent cross bars corresponding to the distance between the upper ends of two adjacent spokes, or approximately so. The cross bars correspond in length to the distance between the opposite outer sides of the rims and adjacent to their opposite end are provided on their opposite flat faces with lateral flanges 14 and 15. It might be stated that the cross bars are slightly curved to conform to the configuration of the rims, and in length these flanges correspond approximately to the widths of the rims. The flanges are secured to the rims by bolts or rivets 16, as clearly shown in Figs. 2 and 3.

Formed in the medial portions of the cross bars and between the rims 11 and 12 are transverse sockets 17. These sockets correspond in length approximately to the distance between the opposed inner sides of the rims, and extend perpendicular to the said rims.

What will subsequently be termed teeth are designated in general by the numeral 18. These teeth are formed of single pieces of metal oblong in contour and rectangular in cross section and of greater width than the cross bars 13. The teeth are of a size to loosely fit within the sockets 17 and are provided with transverse openings adapted to aline with similar openings 19 formed in the cross bars and perpendicular to the sockets 17, these alining openings receiving bolts 20 or other equivalents, by means of which the teeth are removably secured in the sockets. By reference now to Fig. 2 it will be seen that the teeth are provided with a plurality of spaced openings, whereby they may be secured at different points in the sockets and thus enable their outer sides to be positioned at various distances from the outer surfaces of the rims, according to the character of the ground over which the wheel is passing.

From the foregoing it can be seen that we have provided a device which is comparatively simple in structure and inexpensive to manufacture, embodying few parts and these so arranged that the danger of derangement will be reduced to a minimum.

We claim—

1. A traction wheel including spaced rims, cross bars connecting said rims and having sockets, and teeth adjustably secured in said sockets.

2. A traction wheel including spaced rims, cross bars connecting said rims and having sockets located between said rims and arranged perpendicular to the rims, teeth arranged in the sockets, and means for adjustably securing the said teeth whereby their outer edges may be secured at various distances from the surfaces of said rims.

3. A traction wheel including an elongated hub, a pair of spaced rims arranged adjacent to the opposite ends of said hub, spokes connecting the rims with the hubs, cross bars connecting the rims and having sockets located between the rims and perpendicular to the latter, a plurality of oblong teeth of greater width than the widths of the cross bars arranged in the sockets, and means for adjustably securing the teeth whereby their outer sides may be positioned at various distances from the surfaces of the rims.

In testimony whereof we affix our signatures in presence of two witnesses.

LOUIS O. LARSON.
ARVID R. LARSON.
SIGFRED JOHNSON.

Witnesses:
ED MALANDER,
HARRY SWANSON.